United States Patent Office 2,894,498
Patented July 14, 1959

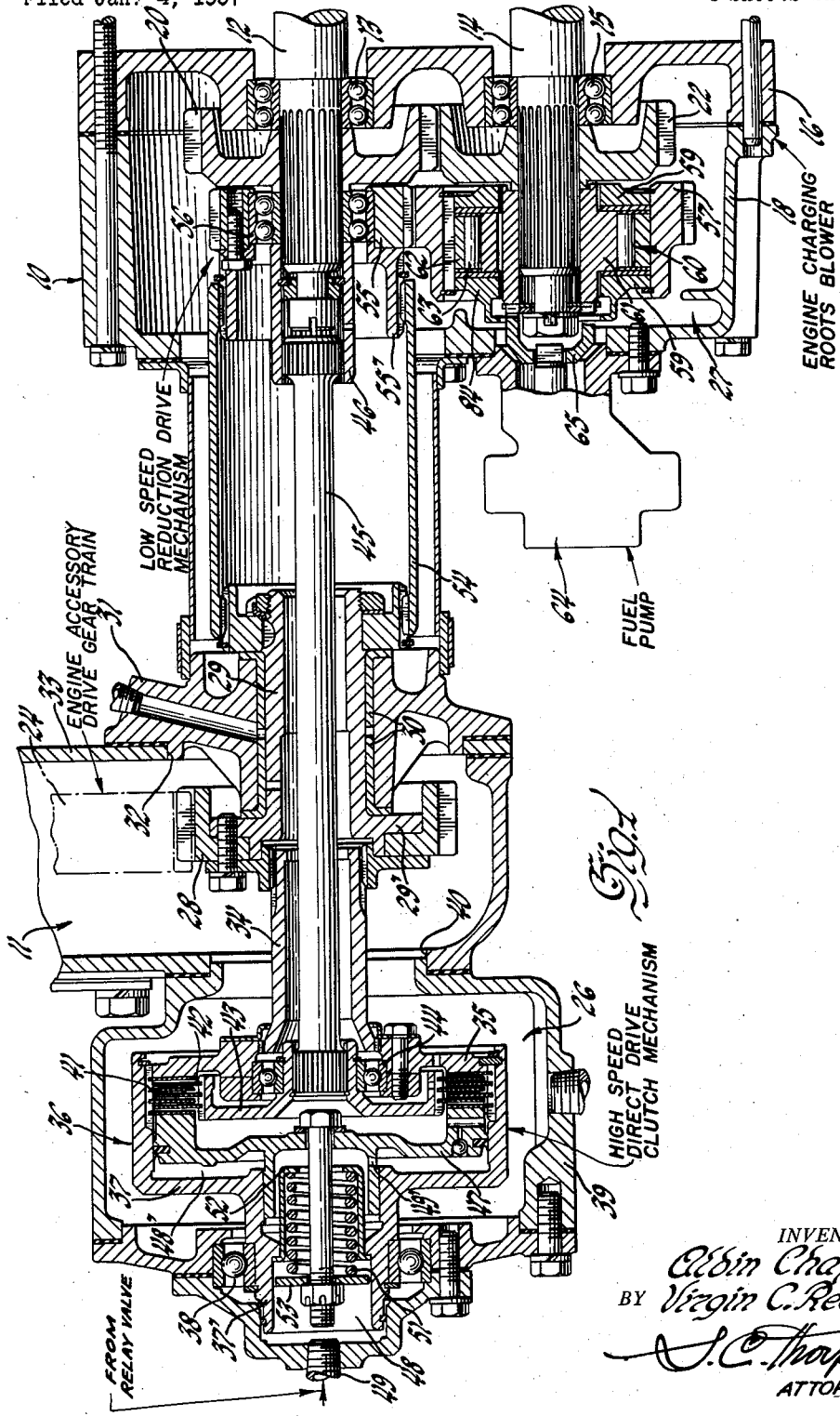

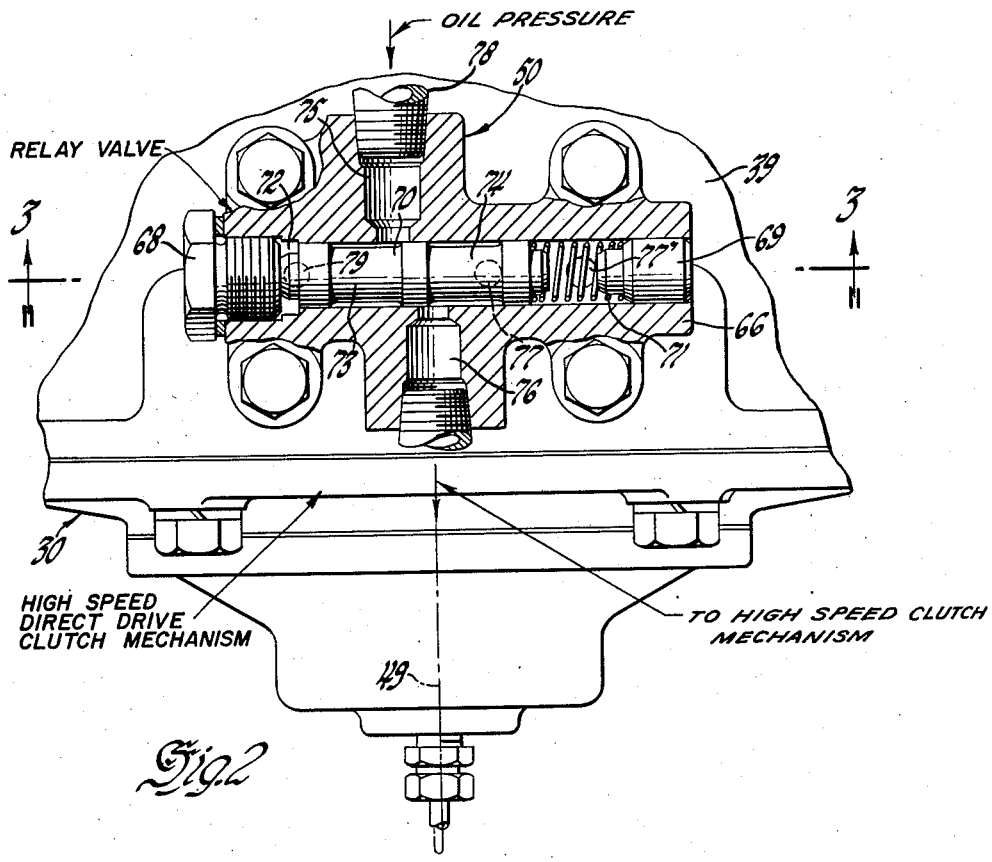
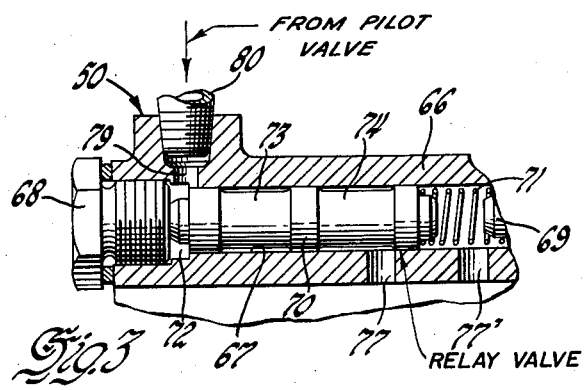

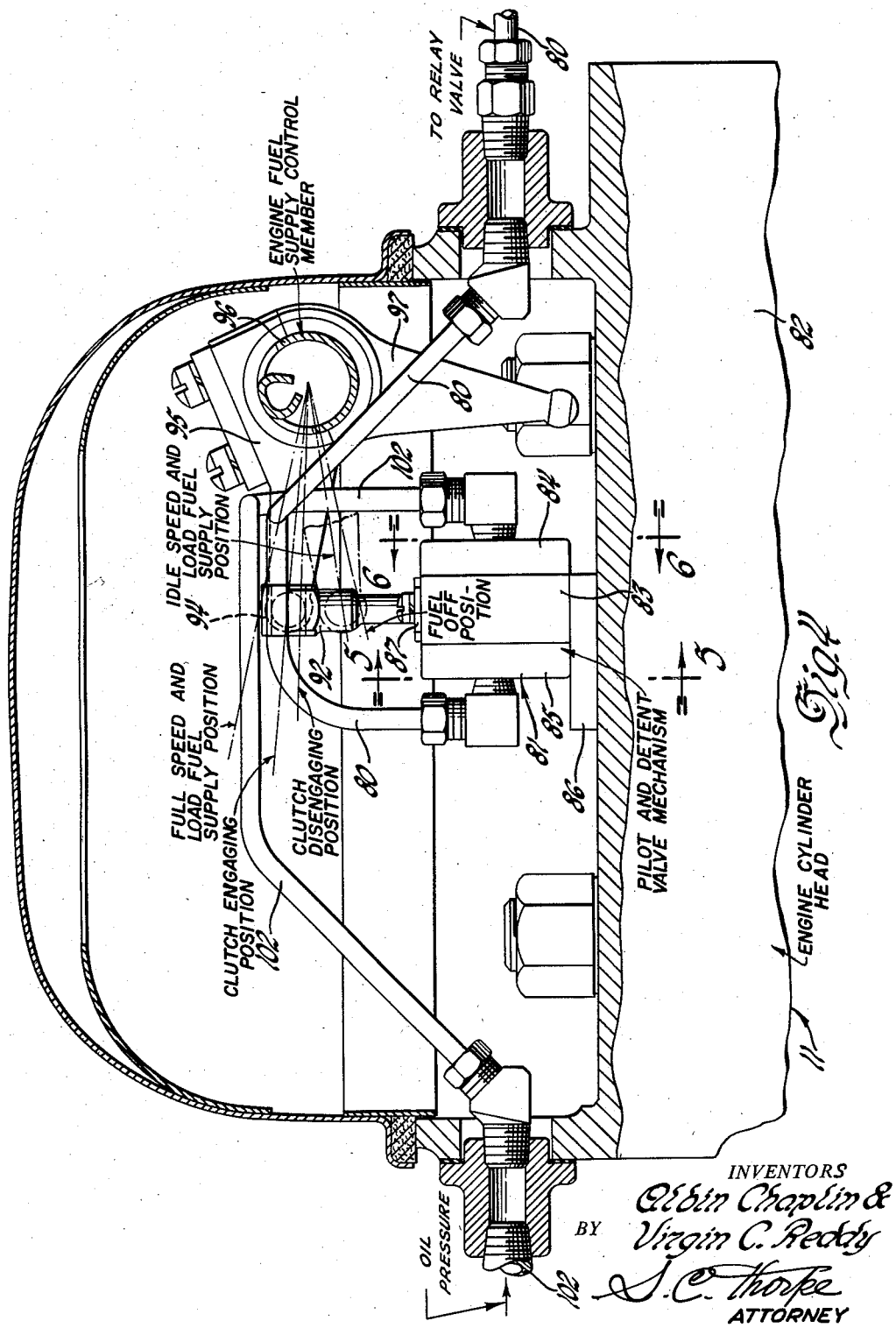

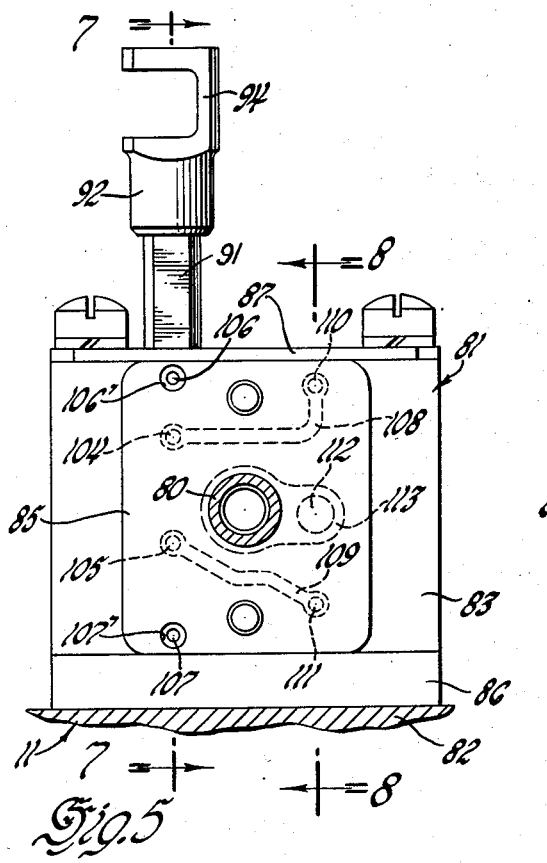

2,894,498

MULTIPLE SPEED DRIVE AND CONTROL SYSTEM

Albin Chaplin, Detroit, and Virgin C. Reddy, Livonia, Mich., assignors to General Motors Corporation, Detroit, Mich., a corporation of Delaware Application January 4, 1957, Serial No. 632,579

17 Claims. (Cl. 123—119)

This invention relates to an accessory mechanism for a prime mover and to a control mechanism therefor; more particularly, to a drive mechanism for an accessory device and to a control mechanism therefor operable in accordance with an operating condition of the prime mover to selectively control the operation of the drive mechanism; and, with regard to certain more specific aspects of the invention, to a two-speed drive mechanism for an accessory device for an internal combustion engine, such as an air compressor adapted to charge the engine, and to a control mechanism therefor operable in accordance with an engine operating condition, i.e. speed, load, to effect alternative drive ratios through the drive mechanism.

For the purpose of illustrating the several aspects of the invention, the invention as herein related is applied to a two-speed drive mechanism adapted to simultaneously drive the several impeller shafts of a Roots type blower which is associated with and adapted to supply scavenging and charging air to an internal combustion engine of the two-cycle fuel injection type; the two alternative drive ratios being selectively established through the drive mechanisms in accordance with the operation of an engine load conscious control mechanism. However, while being particularly advantageous in such an operational environment, the invention is not so limited; the several aspects of the invention being applicable to actuating devices and their associated control mechanisms, generally.

Among the principal objects of the invention are to provide an improved control mechanism for an actuating device; to provide an improved control mechanism for an actuating device associated with a prime mover accessory; to provide an improved actuating device with a control means responsive to variable operating conditions of an associated mechanism; to provide an improved drive mechanism for an accessory device associated with a prime mover selectively operable in accordance with a prime mover operating condition; more particularly, to provide an improved control valve mechanism operable to supply fluid pressure to a pressure operated device in accordance with changes in a variable operating condition of an associated device; to provide an improved multiple speed drive mechanism for an engine driven blower with a fluid pressure actuated change speed mechanism and a control valve mechanism operable to control the flow of actuating fluid pressure to and from the pressure actuated mechanism in accordance with changes in a variable engine operating condition; and further and more specifically, to provide an improved two-speed drive mechanism for a multiple impeller blower having a fluid pressure actuating mechanism adapted to provide alternative drives and a control valve mechanism operable to control the flow of actuating fluid pressure to and from the pressure actuated mechanism, thereby controlling the drive ratio of the blower, in accordance with the movement of an engine load conscious member without hunting.

The foregoing and other objects, advantages and features of the invention will be more thoroughly understood from the following description of the illustrative embodiment of the invention, reference being had to the accompanying drawings, in which:

Figure 1 is a longitudinal sectional view of a blower drive mechanism constructed in accordance with the invention;

Figure 2 is a fragmentary elevational view of a portion of the blower drive mechanism shown in Figure 1 with portions thereof broken away and in section to show the details of a relay valve forming a portion of the blower drive control mechanism constructed in accordance with the invention;

Figure 3 is a sectional view of the relay valve taken substantially on the line 3—3 of Figure 2.

Figure 4 is a transverse sectional view of an engine cylinder head showing another portion of the blower drive control mechanism including a combined pilot and detent valve mechanism;

Figure 5 is a view of the combined pilot and detent valve mechanism taken substantially on the line 5—5 of Figure 4;

Figure 6 is a view similar to Figure 5 taken substantially on the line 6—6 of Figure 4;

Figure 7 is a transverse sectional view of the pilot and detent valve mechanism taken substantially on the line 7—7 of Figure 5; and Figure 8 is a view similar to Figure 7 taken substantially on the line 8—8 of Figure 5.

Referring more particularly to the drawings, Figure 1 shows one end of a Roots type, positive displacement blower which is indicated generally by the numeral 10 and is adapted to supply scavenging and charging air to an internal combustion engine of the two-cycle compression ignition type. The engine is partially shown in the several views and designated by the numeral 11. The blower 10 includes two impeller drive shafts 12 and 14 which are journaled in side-by-side, spaced parallel relation in suitable bearings 13 and 15, respectively, which are in turn mounted in an end plate 16 of the blower casing. The ends of the shafts 12 and 14 project within a chamber formed by the end plate 16 and a timing gear cover 18. Two timing gears 20 and 22 secured to the respective ends of these shafts drivingly engage to synchronize the rotation of the two impeller drive shafts.

An engine driven camshaft timing gear, indicated in broken lines at 24, is adapted to drive the blower impeller shafts 12 and 14 alternatively at different drive ratios through a two-speed drive mechanism constructed in accordance with certain aspects of the invention and including a selectively operable direct drive clutch mechanism 26 and an overrunning reduction drive mechanism 27. The camshaft timing gear 24 drivingly engages a gear 28 which is secured to a flange 29' formed on one end of a sleeve shaft 29 which serves as an input drive member common to both the direct drive clutch mechanism 26 and the reduction drive mechanism 27. The shaft 29 is journaled in a suitable bearing 30 carried by a bearing supporting adapter 31 which is mounted in an opening 32 in the engine timing gear cover 33.

The direct drive clutch mechanism 26 comprises a clutch driving sleeve or coupling member 34 which drivingly interconnects the input shaft 29 with a web member 35 of a clutch housing 36. The clutch housing 36 includes a cylinder member 37 of stepped diameter; the reduced diameter end 37' thereof being rotatably journaled, as indicated at 38, in a clutch casing 39 which is supported by the engine timing gear cover 33, being mounted in an opening 40 formed in the gear cover 33 coaxially of the shaft 29 and the opening 32. A plurality of clutch plates 41 are externally splined to the clutch housing 36 and are sandwiched between clutch plates 42 which are internally splined to a clutch output hub 43. The hub 43 is journaled with respect to the clutch housing web 35 by a bearing 44 and is drivingly connected by a quill shaft 45 and a coupling sleeve 46 to the drive end of the impeller shaft 12. A piston 47 of stepped diameter is reciprocably mounted in the clutch cylinder 37, 37' to form two expansible clutch actuating chambers 48, 48' which are interconnected by at least one hole 49' in the piston. The expansible chambers 48, 48' are connected by a pressure line 49 to a relay valve mechanism 50, which as shown in Figure 2 is mounted on the clutch casing 39.

As explained in greater detail below, the relay valve 50 is selectively operable to supply pressurized fluid to the chambers 48, 48' thereby actuating the piston 47 to the right overcoming the force exerted by a clutch return spring 51, which is compressibly interposed between spring retainers 52 and 53 carried by the reduced diameter end of the cylinder 37 and the piston 47, respectively. In moving to the right, the piston establishes frictional driving contact between the clutch plates 41 and 42 thereby establishing the direct drive connection between the input gear 28 and the impeller drive shaft 12. When the direct drive clutch mechanism 26 is de-energized, the actuating pressure applied to the chambers 48, 48' being relieved by the relay valve 50 and the piston 47 being returned to the left by the return spring 51, the overrunning reduction drive mechanism 27 is rendered effective to drivingly connect the sleeve shaft 29 with the impeller drive shafts.

The reduction drive mechanism 27 comprises a coupling sleeve 54 which drivingly interconnects the input shaft 29 with an extension 55' of a reduction driving gear 55. The gear 55 is journaled on the end of the impeller shaft 12 by a bearing 56 and drivingly engages a reduction driven gear 57 which is adapted to be drivingly connected to the shaft 14 by an overrunning clutch mechanism 60. The gear 57 is rotatably mounted by two bearing flanges 59 relative to an inner race 61 of the overrunning clutch mechanism 60. The race 61 is splined to the end of the shaft 14 and cooperates with an overrunning cam 62, which is non-rotatably embraced by the gear 57, and a plurality of clutch engaging rollers or sprags 63 to establish a driving connection between the gear 57 and the shaft 14 when the gear 57 is being driven faster than the impeller shaft 14 and to disengage or overrun when the impeller shaft is being driven faster than the reduction driven gear.

An engine fuel or lubrication pump 64 may be mounted on the end of the blower drive casing member 18 and driven off the lower impeller shaft 14 by a suitable drive connection 65 thus imparting the alternative blower speeds to this accessory pump.

As shown in Figures 2 and 3, the relay valve 50 comprises a valve body 66 suitably mounted on the clutch casing 39 and has a bore 67 extending longitudinally therethrough. The bore 67 is closed at both ends by plugs 68 and 69 and reciprocably mounts a spool type valve member 70. A spring 71 is compressibly interposed between the plug 69 and the valve member 70 and biases the valve member towards an expansible valve actuating chamber 72 intermediate the valve member and the plug 68. The ends of the valve member 70 are of reduced diameter and coact with the plugs 68 and 69 to provide valve stops. Two reduced diameter land portions 73 and 74 intermediate the ends of the valve member are adapted to alternatively and respectively connect a pressure inlet port 75 to a pressure outlet port 76 when the valve member is shifted from its position shown in Figures 2 and 3 into abutment with the plug 69 and to connect the pressure outlet port 76 to a drain port 77 when the valve member 70 is shifted to its position as shown. The pressure inlet port 75 is connected by piping 78 to a source of fluid pressure, not shown, such as the engine lubrication pressure system and the pressure outlet port 76, which is longitudinally offset therefrom, is connected by the piping 49 to the actuating chambers 48, 48' of the direct drive clutch mechanism 26. The drain port 77 is spaced longitudinally of the valve body from the outlet port 76 and opens on the interior of the clutch casing 39. The spring chamber intermediate the plug 69 and the valve member 70 is also vented to the interior of the clutch housing by a drain port 77'. The valve actuating chamber 72 is connected by a port 79 and a pressure supply line 80 to the combined pilot and detent control valve mechanism 81 which, as best shown in Figure 4, is mounted on the cylinder head 82 of the engine 11 and is adapted to selectively control the valve actuating pressure supplied to the chamber 72.

The combined pilot and detent valve mechanism 81 serves as a remote control valve and comprises a valve body including a central body member 83, two side cover or port plates 84 and 85, a mounting plate 86 and a top cover plate 87, all of which are suitably secured together and mounted on the engine head 82. As best seen in Figures 7 and 8, the valve body member 83 is provided with two bores 88 and 89 in side-by-side spaced parallel relation; the bore 88 extending therethrough and being in alignment with openings 90 and 91 in the valve mounting plate 86 and the top plate 87, respectively. The bore 88 reciprocably mounts a pilot valve spindle 92 which is operable to automatically control the operative position of a detent valve member 93 which is reciprocably mounted in the valve bore 89. The upper end of the valve spindle 92 projects outwardly of the valve body through the opening 91 and is pivotally connected at 94 to a lever arm 95. The lever arm 95 is secured to an injector or throttle control tube 96 which is rotatably mounted in suitable bearing brackets, not shown, and has a plurality of lever arms 97 longitudinally spaced thereon which operably interconnect the engine throttle control linkage mechanism including the control tube 96 with the fuel supply controlling racks of unit fuel injectors, not shown.

Intermediate its ends, one side of the valve body member 83 is provided with two longitudinally spaced pressure inlet ports 98 and 99 opening on the bore 88 intermediate its ends and with a single pressure inlet port 100 opening on the bore 89 intermediate its ends. The ports 98, 99 and 100 are interconnected by a common passage 101 formed in the side cover plate 84 and piping 102 to a source of pressurized fluid such as the engine lubricating pressure system. A drain port 103 also opens on the bore 89 in longitudinally spaced, side-by-side relation to the inlet port 100 and is aligned with a drain passage 103' provided in the cover plate 84. The side of the valve body member 83 opposite the ports 98, 99, 100 and 103 is provided with two pressure ports 104 and 105 and two drain ports 106 and 107 opening on the bore 88 in longitudinally spaced and flanking relation to the ports 98 and 99. The drain ports 106 and 107 are aligned with drain passages 106' and 107', respectively, which are provided in the cover plate 85. The pressure ports 104 and 105 are connected by passages 108 and 109 formed in the cover plate 85 with two ports 110 and 111, respectively, opening adjacent the closed opposite ends of the valve bore 89. A pressure delivery port 112 opens on the bore 89 intermediate the ports 110 and 111 and is connected by a passage 113 formed in the plate 85 and piping 80 to the relay valve actuating chamber 72.

The pilot valve spindle 92 is provided with a reduced diameter portion 115 and with two flanking flats 116 and 117 which are operable to control the flow of fluid between the several ports opening on the bore 88 and thereby the operative positions of the detent and relay valve members 93 and 70 in accordance with the fuel supply controlling movement of the injector control tube 96. The injector control tube 96 is rotatable in a clockwise increasing fuel direction, as viewed in Figure 4, between a fuel "off" position, a normal "idle" fuel supplying position and a "wide open throttle" or "full torque and speed" fuel supplying position. When the pilot valve spindle is in its lowest fuel "off" position, the chamber above the detent valve member 93 is vented to the atmosphere through the port 110, the passage 108, port 104, flat 91 and port 106 and the reduced diameter portion 115 interconnects the inlet port 99 with the lower chamber intermediate the detent valve member 93 and the bore 89 through the port 105, the passage 109 and the port 111. The fluid pressure thus applied to the detent valve member 93, shifts the detent valve to its upper position shown in Figure 8 wherein a reduced diameter portion 118 thereon vents the actuating chamber 72 of the relay valve through the port 79, piping 80, passage 113 and port 112 to the drain port 103. This venting of the chamber 72 permits the relay valve return spring to shift the relay valve member 70 to the position shown in Figures 2 and 3 wherein the reduced diameter portion 74 of the relay member 70 interconnects the clutch actuating chamber 48 and 48' to the drain port 77. Hence the direct drive clutch mechanism 26 is de-energized and the reduction drive mechanism 27 is effective to drivingly interconnect the blower drive shafts 12 and 14 with the engine timing gear 24.

This reduction drive operating condition is maintained as the injector control tube is rotated in its increasing fuel direction shifting the valve spindle upwardly until the valve spindle reaches an intermediate clutch engaging position shown in several figures. As best seen in Figure 7, further upward movement of the valve spindle 92 beyond this position acts to interconnect the pressure inlet port 98 with the upper detent valve actuating chamber through the port 104, passage 108 and port 110, and vents the lower detent valve actuating chamber to drain through the port 111, passage 109, port 105 and port 107. This causes the detent valve member 93 to shift to its lower position closing the drain port 103 and connecting the pressure inlet port 100 to the relay valve actuating chamber 72 through the port 112, passage 113 and piping 80. The fluid pressure thus applied shifts the relay valve member 70 to its extreme right hand position, as viewed in Figures 2 and 3, in which position the reduced diameter portion 73 thereon interconnects the pressure inlet port 75 with the clutch actuating chambers 48 and 48' through port 76 and piping 49 thus causing the clutch mechanism 26 to establish the direct driving connection intermediate the engine timing gear 24 and the impeller drive shaft 12.

Direct drive operation of the blower is maintained as long as the movement of the pilot valve spindle 92 is above a clutch disengaging intermediate position. Due to the longitudinal spacing of the ports opening on the bore 88 and of the coacting lands on the pilot valve spindle 92, this clutch disengaging intermediate position corresponds to a decreased fuel supplying position of the injector control tube relative to the tube position at which the valve spindle 92 is effective to initially establish the direct drive operating condition. Assuming downward movement of the valve spindle 92 from its intermediate clutch engaging position, as viewed in Figure 7, it will be obvious that the valve spindle is required to move downwardly a certain increment before the flat 116 will interconnect the upper detent actuating chamber with the drain port 106 and the reduced diameter portion 115 acts to interconnect the lower detent valve actuating chamber to the pressure inlet port 99. When this is accomplished, the detent valve member 93 is shifted to its upper clutch disengaging control position wherein actuating pressure is vented from the relay valve which in turn vents the actuating chambers 48, 48' of the direct drive clutch mechanism 26. As the clutch mechanism disengages, the overrunning reduction drive 27 is again rendered effective to drive the impeller shafts 12 and 14 at a reduced ratio.

Inasmuch as the quantity of fuel supplied to the engine varies in accordance with the speed-load demands imposed upon the engine and the completeness of combustion of the fuel supplied to the engine is dependent upon the weight of air supplied, a load conscious control mechanism is used to regulate the driving connection established between the engine and the blower impeller drive shafts in the illustrative embodiment of the invention in preference to a speed conscious control. Such a blower drive control system has particular application in vehicular and marine engine installations where it provides "overdrive" type operation reducing the blower charging load at lower engine speed-load demands thus making more horsepower available at the engine output shaft while permitting the engine to meet higher engine speed-load demands by simultaneously increasing the air and fuel charges. The use of the combined load sensitive pilot and detent valve control mechanism prevents hunting of the two-way drive mechanism which would be destructive to the components of both the blower and the two-speed drive mechanism; prevents application of appreciable hydraulic and frictional loads on the throttle control mechanism which in most instances would normally be imposed on an associated, relatively sensitive governor mechanism; and permits the use of relatively small pressure lines to and from the control valve mechanism on the cylinder head and of relatively short larger pressure lines between the relay valve and clutch actuating mechanism.

It will also be noted that the accessibility of the components of the illustrative two-speed drive mechanism permits the same basic blower and engine drive arrangement to be used with a plurality of drive combinations depending upon the particular application in which the engine is to be utilized: using the instant two-speed drive mechanism in applications where the engine is subject to intermittent relatively high load demands; using a simple direct drive coupling member between the input gear 29 and the upper blower shaft 12 in those applications where the engine is subjected to relatively high continuous load demands; and using a simple drive coupling between the input gear 29 and the reduction driving gear 55 with a reduction driven gear secured to the lower blower shaft in those applications where the engine is subjected to relatively lower load demands.

From the foregoing description it will be seen that the several objects of the invention are attained in the illustrative embodiment of the invention. However, while the description of the invention has been limited to this single illustrative embodiment of the invention, it will be obvious to those skilled in the art that the several aspects of the invention may be used severally or in combination and that various modifications may be made therein without departing from the spirit and scope of the invention, as defined in the following claims.

We claim:

1. In an internal combustion engine, the combination comprising a multiple impeller blower adapted to supply scavenging and charging air to the engine, said blower having two impeller drive shafts rotatably mounted in side-by-side parallel relation and having synchronizing gears drivingly interconnecting said impeller shafts, a power input means including a rotatably driven shaft, a first clutch means selectively energizable to establish a direct drive connection between said input shaft and one of said impeller shafts, an engine fuel supply control member shiftable between an engine idle and full speed and load fuel supplying positions, hydraulic control means for said first clutch means operable in accordance with the operative movement of said fuel supply control member relative to an intermediate fuel supply position, said control means being operable to energize said first clutch means when said fuel supply member is shifted between its intermediate and full speed and load fuel supply positions and being operable to de-energize said first clutch means when said fuel supply member is shifted between its intermediate and idle speed and load fuel supply positions, a reduction driving gear rotatably journaled on said one impeller shaft and drivingly connected to said input shaft, said reduction driving gear meshing with a reduction driven gear mounted in spaced concentric relation to the other of said impeller shafts, and a second clutch means intermediate said reduction driven gear and said other impeller shaft, said second clutch means being adapted to drivingly interconnect said reduction driven gear and said other impeller shaft when said first clutch mechanism is de-energized and adapted to permit said other impeller shaft to overrun said reduction driven gear when said first clutch mechanism is energized.

2. In an internal combustion engine, an accessory drive mechanism comprising, in combination, two accessory drive shafts rotatably mounted in side-by-side spaced parallel relation, a first gear means drivingly interconnecting said accessory drive shafts and establishing a fixed drive ratio therebetween, a power input means including a rotatably driven shaft, a second gear means adapted to drivingly interconnect said accessory drive shafts including a reduction driving gear rotatably journaled on one of said accessory drive shafts and drivingly connected to said input member, said reduction driving gear meshing with a reduction driven gear mounted in spaced concentric relation to the other of said accessory drive shafts, a first clutch means selectively energizable to establish a direct drive connection between said input shaft and said one accessory drive shaft, a second clutch means intermediate said reduction driven gear and said other impeller shaft, said second clutch means being adapted to drivingly connect said reduction driven gear and said other impeller shaft when said first clutch mechanism is deenergized and adapted to permit said other impeller shaft to overrun said reduction driven gear when said first clutch mechanism is energized, an engine fuel supply control member shiftable between an engine idle and a full speed and load fuel supplying positions, and control means for said first clutch means operable in accordance with the operative movement of said fuel supply control member relative to an intermediate fuel supply position, said control means being operable to energize said first clutch means when said fuel supply member is shifted between its intermediate and its full speed and load fuel supply positions and being operable to deenergize said first clutch means when said fuel supply member is shifted between its intermediate and its idle speed and load fuel supply positions.

3. In an internal combustion engine, the combination comprising a blower adapted to supply scavenging and charging air to the engine, said blower having an impeller drive shaft, a power input means including a rotatably driven shaft, a multiple speed power transmitting means selectively energizable to establish alternative driving connections of different drive ratios between said input shaft and said impeller shaft, an engine fuel supply control member shiftable between an engine idle and full speed and load fuel supplying positions, and means operable to control said multiple speed power transmitting means in accordance with the operative movement of said fuel supply control member relative to an intermediate fuel supplying range of movement, said control means being operable to energize said power transmitting means to establish one drive ratio between said shafts when said fuel supply member is shifted between its intermediate and full speed and load fuel supply positions and being operable to establish a second drive ratio between said shafts when said fuel supply member is shifted between its intermediate and idle speed and load fuel supply positions.

4. A two-speed drive mechanism for a multiple impeller blower including at least two impeller shafts rotatably mounted in side-by-side parallel relation, a synchronizing gear non-rotatably secured to each of said impeller shafts, said synchronizing gears drivingly interconnecting said shafts, a power input means including a member adapted to be rotatably driven by a prime mover, clutch means selectively energizable to establish a direct drive connection between said input member and one of said impeller shafts, a reduction driving gear rotatably journaled on said one output shaft and drivingly connected to said input member, said reduction driving gear meshing with a reduction driven gear mounted in spaced concentric relation to the other of said impeller shafts, and an overrunning clutch means intermediate said reduction driven gear and said other impeller shaft and adapted to drivingly connect said reduction driven gear and said other impeller shaft when said selective clutch mechanism is deenergized.

5. A two-speed drive mechanism for simultaneously driving two rotatably mounted output shafts, said drive mechanism comprising, in combination, a power input means including a shaft member adapted to be rotatably driven by a prime mover, a clutch mechanism selectively operable to drivingly interconnect said input shaft with one of said output shafts, a first gear non-rotatably mounted on said one output shaft and drivingly engaging a second gear non-rotatably mounted on the other of said output shafts thereby establishing a fixed rotational ratio between said output shafts, a third gear rotatably mounted on said one output shaft and drivingly engaging a fourth gear adapted to drive said other output shaft, the rotational ratio between said third and fourth gears being different than the ratio between said first and second gears, and an overrunning clutch means intermediate said second gear and said other output shaft adapted to overrun when said input shaft is drivingly connected to said one output shaft by said selectively operable clutch mechanism and adapted to drivingly connect said fourth gear to said other output shaft when said clutch mechanism is rendered inoperable to drivingly connect said input shaft to said one output shaft.

6. In a multiple speed drive mechanism, the combination comprising two rotatably mounted driven shafts, a first gear non-rotatably mounted on one of said driven shafts and drivingly engaging a second gear non-rotatably mounted on the other of said driven shafts thereby synchronizing the rotational outputs of said shafts, a power input means including a driving shaft adapted to be rotatably driven by a prime mover, a first clutch mechanism selectively operable to drivingly interconnect said driving shaft means with said one driven shaft, a third gear rotatably mounted on said one driven shaft and drivingly engaging a fourth gear adapted to drive the other of said driven shafts, and a second clutch mechanism intermediate said second gear and said other driven shaft, said second clutch mechanism being adapted to drivingly connect said fourth gear to said other shaft when said one driven shaft is drivingly disconnected from said driving shaft by the selective operation of said first clutch mechanism and adapted to overrun when said one driven shaft is drivingly connected to said driving shaft.

7. A multiple speed drive mechanism adapted to synchronously and rotatably drive two power output shafts including a first means drivingly interconnecting said output shafts, a power input means including a shaft adapted to be rotatably driven by a prime mover, a first coupling means adapted to selectively interconnect said input shaft with one of said output shafts including a selectively operable clutch mechanism comprising a driving member drivingly connected to said input member, a driven member drivingly connected to said one output shaft, and means for selectively energizing said clutch mechanism to drivingly interconnect said driving and driven members, and a second coupling means adapted to drivingly interconnect said input shaft with the other of said output shafts at a different drive ratio when said selectively operable clutch mechanism is deenergized, said second coupling means including a driving gear rotatably journaled on said first output shaft and drivingly connected to said input shaft, said driving gear engaging a driven gear mounted in spaced concentric relation to the axis of said other output shaft, and an overrunning clutch mechanism interposed between said driven gear and said other output shaft, said overrunning clutch mechanism being adapted to establish a driving connection between said driven gear and said other output shaft when said first clutch means is deenergized.

8. In a multiple speed drive mechanism as set forth in claim 7, said clutch energizing means comprising a fluid pressure actuated device and a valve mechanism operable to control the flow of pressurized fluid to and from said device.

9. In a multiple speed drive mechanism as set forth in claim 7, said clutch energizing means comprising a fluid pressure actuated device, a member operable to control the output of said prime mover and progressively shiftable between a minimum, a first intermediate, a second intermediate and a full speed and load controlling position, and valve means operable in accordance with the operative movement of said control member to selectively supply actuating pressure to said pressure actuated device, said valve means including a relay valve means shiftable between a first position and a second position to control the supply of pressurized fluid to and from said fluid pressure actuated device, respectively, a detent valve shiftable to control the supply of actuating fluid to said relay valve and thereby the operational position thereof, and a pilot valve operatively connected to said control member and operable to supply fluid pressure controlling the operative position of said detent valve, said pilot and detent valves coacting to shift said relay valve to one of its positions when said control member is shifted between its minimum and its second intermediate positions and to shift said relay valve to its other position when said control member is shifted beyond its second intermediate position towards its full speed and load position and coacting to return said relay valve to said one position when said control member is returned to its range of movement between its first intermediate and its minimum speed and load positions.

10. In an internal combustion engine, an accessory drive shaft, a power input means including a rotatably driven shaft, a change speed mechanism selectively energizable to establish alternative drive connections between said input shaft and said accessory drive shaft, fluid pressure actuating means operable to actuate said change speed mechanism to establish said alternative drive connections, an engine fuel supply control member shiftable between an engine idle and a full speed and load fuel supplying positions, and means operably connected to said control member and adapted to control the flow of pressurized fluid from a pressure supply to said fluid pressure actuating means thereby controlling the selective establishment of alternative drive connections through said change speed mechanism in accordance with the operative movement of said fuel supply control member relative to an intermediate fuel supply range of movement, said control means being operable to effect a first drive connection through said change speed mechanism when said fuel supply member is shifted between its intermediate and its full speed and load fuel supply positions and being operable to effect a second drive connection through said change speed mechanism when said fuel supply member is shifted between its intermediate and its idle speed and load fuel supply positions.

11. In an internal combustion engine, the combination comprising an accessory drive shaft, a power input means including a rotatably driven shaft, a change speed mechanism selectively energizable to establish alternative drive connections between said input shaft and said accessory drive shaft, fluid pressure actuating means operable to control the alternative drive connection established through said change speed mechanism, an engine fuel supply control member shiftable between an engine idle, a first intermediate, a second intermediate and a full speed and load fuel supplying positions, and a control valve means operable in accordance with the operative movement of said fuel supply control member relative to said first and second intermediate fuel supply positions to selectively supply actuating pressure to said actuating means thereby controlling the alternative drive connection established through said change speed mechanism, said control valve means including a pilot valve, a detent valve, and a relay valve, said relay valve being shiftable between a first position and a second position to control the supply of pressurized fluid to said fluid pressure actuating means thereby causing said fluid pressure actuating means to effect a first and a second drive connection, respectively, said detent valve being shiftable to control the supply of actuating fluid to said relay valve and thereby the operational position thereof, and said pilot valve being operatively connected to said fuel supply control member and operable to supply fluid pressure controlling the operative position of said detent valve, said control means coacting with said actuating means to energize said change speed mechanism to establish one of said alternative drive connections when said fuel supply member is shifted between its idle and its second intermediate fuel supply positions and to establish the other of said drive connections when said fuel supply member is shifted between its second intermediate and its full speed and load fuel supply positions and coacting to re-establish said one drive ratio connection when said fuel supply member is returned to its range of movement between its first intermediate and its idle speed and load fuel supply positions.

12. In an internal combustion engine, an accessory drive mechanism comprising, in combination, two accessory drive shafts rotatably mounted in side-by-side spaced parallel relation, a first gear means drivingly interconnecting said accessory drive shafts and establishing a fixed drive ratio therebetween, a power input means including a rotatably driven shaft, a first clutch means selectively energizable to establish a direct drive connection between said input shaft and one of said accessory drive shafts, a second gear means adapted to drivingly connect said input shaft to said accessory drive shafts including a reduction driving gear rotatably journaled on said one accessory drive shaft and drivingly connected to said input member, said reduction driving gear meshing with a reduction driven gear mounted in spaced concentric relation to the other of said accessory drive shafts, and a second clutch means intermediate said reduction driven gear and said other accessory drive shaft, said second clutch means being adapted to drivingly interconnect said reduction driven gear and said other accessory drive shaft when said first clutch means is deenergized and adapted to permit said other shaft to overrun said reduction driven gear when said first clutch means is energized, fluid pressure actuating means operable to energize said first clutch means to establish said direct drive connection, an engine fuel supply control member shiftable between an engine idle, a first intermediate, a second intermediate and a full speed and load fuel supply positions, and a control valve means operable in accordance with the operative movement of said fuel supply control member relative to said first and second intermediate fuel supply positions to selectively supply actuating pressure to said actuating means thereby controlling the alternative drive connections established through said clutch means, said control valve means including a pilot valve, a detent valve and a relay valve, said relay valve being shiftable between a first pressure supply position and a second pressure venting position to control the application of pressurized fluid to said fluid pressure actuating means, said detent valve being shiftable to control the supply of actuating fluid to said relay valve and thereby the operational position thereof, and said pilot valve being operatively connected to said fuel supply control member and operable to supply fluid pressure controlling the operative position of said detent valve, said control valve means coacting with said pressure actuating means to de-energize said first clutch means thereby establishing said reduction drive connection through said second clutch means when said fuel supply member is shifted between its idle and its second intermediate fuel supply positions and to energize said first clutch means thereby establishing said direct drive connection when said fuel supply member is shifted beyond its second intermediate position and towards its full speed and load fuel supply position and coacting to re-establish said reduction drive connection when said fuel supply member is returned to its range of movement between its first intermediate and its idle speed and load fuel supply positions.

13. In an internal combustion engine, a fluid pressure actuated accessory device adapted to control an engine operating condition, an engine fuel supply control member shiftable between an engine idle, a first intermediate, a second intermediate and a full speed and load fuel supply positions, and a control valve means operable in accordance with the operative movement of said fuel supply control member relative to said first and second intermediate fuel supply positions to selectively control the application of actuating fluid pressure to and from said accessory device, said control valve means including a relay valve shiftable between a first pressure position and a second pressure position to control the supply of pressurized fluid to and from said accessory device, a detent valve shiftable to control the supply of actuating fluid to said relay valve and thereby the operational position thereof, and a pilot valve operatively connected to said fuel supply control member and operable to supply fluid pressure controlling the operative position of said detent valve, said control valve means coacting to provide a first actuating fluid supply control condition when said fuel supply member is shifted between its idle and its second intermediate fuel supply positions and to provide a second actuating fluid supply control condition when said fuel supply member is shifted beyond its second intermediate position toward its full speed and load fuel supply positions and coacting to re-establish said first actuating fluid supply control condition when said fuel supply member is returned to its range of movement between its first intermediate and its idle speed and load fuel supply positions.

14. A control system including a fluid pressure actuated control device adapted to control a first operating condition of an associated mechanism in accordance with a second operating condition of said mechanism, a control member progressively shiftable to control said second operating condition between a minimum, a first intermediate, a second intermediate and a maximum condition controlling position, and a control valve means operable in accordance with the operative movement of said control member relative to its first and second intermediate positions to selectively control the application of actuating fluid pressure to and from said control device, said control valve means including a relay valve shiftable between a first position and a second position to control the supply of pressurized actuating fluid to and from said control device, a detent valve shiftable to control the operational position of said relay valve, and a pilot valve operatively connected to said control member and operable to control the operative position of said detent valve, said pilot and detent valves coacting to shift said relay valve to its first actuating fluid supply position when said control member is shifted between its minimum and its second intermediate condition controlling positions and to its second actuating fluid supply position when said control member is shifted beyond its second intermediate position toward its maximum condition controlling position and coacting to return said relay valve to its first actuating fluid supply position only when said control member is returned to its range of movement between its first intermediate and its minimum condition controlling positions.

15. In an internal combustion engine, an accessory drive mechanism comprising, in combination, a multiple impeller blower of a positive displacement type adapted to supply scavenging and charging air to the engine, said blower having at least two impeller drive shafts rotatably mounted in side-by-side spaced parallel relation, a first gear means drivingly interconnecting and synchronizing said impeller drive shafts, a power input means including a rotatably driven shaft, a first clutch means selectively energizable to establish a direct drive connection between said input shaft and one of said impeller drive shafts, a second gear means adapted to drivingly interconnect said input driven shaft with the other of said impeller shafts including a reduction driving gear rotatably journaled on said one impeller drive shaft and drivingly connected to said input member, said reduction driving gear meshing with a reduction driven gear mounted in spaced concentric relation to said other impeller drive shaft, and a second clutch means intermediate said reduction driven gear and said other impeller shaft, said second clutch means being adapted to drivingly connect said reduction driven gear and said other impeller shaft when said first clutch means is de-energized and adapted to permit said other impeller shaft to overrun said reduction driven gear when said first clutch means is energized, fluid pressure actuating means operable to energize said first clutch means to establish said direct drive connection, an engine fuel supply control member shiftable between an engine idle, a first intermediate, a second intermediate and a full speed and load fuel supply positions, and a control valve means operable in accordance with the operative movement of said fuel supply control member relative to said first and second intermediate fuel supply positions to selectively control the flow of actuating pressure to and from said actuating means thereby controlling the energization of said first clutch means, said control valve means including a relay valve shiftable between a first position and a second position to control the flow of pressurized fluid to and from said fluid pressure actuating means, respectively, a detent valve shiftable to control the operational position of said relay valve, and a pilot valve operatively connected to said fuel supply member and operable to control the operative position of said detent valve, said pilot and detent valves coacting to shift said relay valve to its second position thereby de-energizing said first clutch means to establish drive through said reduction gears when said fuel supply member is shifted between its idle and its second intermediate fuel supply positions and to shift said relay valve to its first position thereby energizing said first clutch means to establish said direct drive connection when said fuel supply member is shifted beyond its second intermediate position towards its full speed and load fuel supply position and coacting to return said relay valve to its second position when said fuel supply member is returned to its range of movement between its first intermediate and its idle speed and load fuel supply positions.

16. In an internal combustion engine as set forth in claim 1, said blower being of a positive displacement type.

17. In an internal combustion engine as set forth in claim 3, said blower being of a positive displacement type.

References Cited in the file of this patent

UNITED STATES PATENTS

| | | |
|---|---|---|
| 2,371,983 | Forsyth et al. | Mar. 20, 1945 |
| 2,374,305 | Paton | Apr. 24, 1945 |